United States Patent
Watson et al.

(10) Patent No.: US 11,259,235 B2
(45) Date of Patent: Feb. 22, 2022

(54) BLOCKING FUNCTIONALITY ON A SMART DEVICE

(71) Applicant: Blackout Technologies Group Ltd, London (GB)

(72) Inventors: Charles Watson, London (GB); Mark Hadley, London (GB); Michael David Astle, Charleston, SC (US)

(73) Assignee: BLACKOUT TECHNOLOGIES GROUP LTD., London (GB)

( * ) Notice: Subject to any disclaimer, the term of this patent is extended or adjusted under 35 U.S.C. 154(b) by 0 days.

(21) Appl. No.: 15/802,583

(22) Filed: Nov. 3, 2017

(65) Prior Publication Data

US 2019/0141605 A1    May 9, 2019

(51) Int. Cl.
- *H04W 48/04* (2009.01)
- *H04W 4/30* (2018.01)
- *H04W 4/021* (2018.01)
- *H04W 12/08* (2021.01)
- *H04W 64/00* (2009.01)

(52) U.S. Cl.
CPC .......... *H04W 48/04* (2013.01); *H04W 4/021* (2013.01); *H04W 4/30* (2018.02); *H04W 12/08* (2013.01); *H04W 64/003* (2013.01)

(58) Field of Classification Search
CPC ....... H04W 4/02; H04W 4/021; H04W 48/04; H04W 4/30; H04W 12/08; H04W 64/003; G06F 21/00; G06F 21/121; G06F 21/123
See application file for complete search history.

(56) References Cited

U.S. PATENT DOCUMENTS

| | | | | |
|---|---|---|---|---|
| 7,574,215 | B1 * | 8/2009 | Fan | G01S 5/0027 342/357.42 |
| 8,588,819 | B2 * | 11/2013 | Issa | H04H 20/61 455/456.3 |
| 9,189,607 | B1 * | 11/2015 | Wick | G06F 21/52 |
| 9,305,162 | B2 * | 4/2016 | Yuen | H04L 63/168 |
| 2010/0246468 | A1 * | 9/2010 | Santhanam | H04W 4/02 370/312 |
| 2013/0102300 | A1 * | 4/2013 | Sigal | H04W 4/48 455/418 |

(Continued)

OTHER PUBLICATIONS

International Search Report and Written Opinion, PCT/EP2018/053167, dated Dec. 21, 2018 (13 pp.).

*Primary Examiner* — Raymond S Dean
(74) *Attorney, Agent, or Firm* — Eversheds Sutherland (US) LLP

(57) ABSTRACT

A method of blocking apps and/or features on a smart device is provided. The smart device may include a GPS receiver and one or more wireless receiver devices. The method may include: detecting, by a control app running on the smart device, movement of the smart device into or out of a predetermined region based on data received by the GPS receiver and/or one or more of the wireless receiver devices; and blocking one or more apps and/or features on the smart device when the smart device is within the predetermined region. The method may include determining a current time; and wherein the one or more apps and/or features is blocked when both the smart device is within the predetermined region and the current time is within a predetermined time period. Also provided is a smart device, a server, and a system including a smart device and a server.

19 Claims, 6 Drawing Sheets

(56) References Cited

U.S. PATENT DOCUMENTS

| | | | |
|---|---|---|---|
| 2014/0136607 A1* | 5/2014 | Ou | H04L 67/18 709/203 |
| 2014/0149559 A1* | 5/2014 | Parviainen-Jalanko | H04L 12/4641 709/220 |
| 2014/0208397 A1* | 7/2014 | Peterson | G06F 21/51 726/4 |
| 2014/0288996 A1* | 9/2014 | Rence | G06Q 10/0635 705/7.28 |
| 2015/0237193 A1 | 8/2015 | Zeilingold et al. | |
| 2015/0327011 A1* | 11/2015 | Fairbanks | G07C 1/10 455/456.3 |
| 2016/0034699 A1* | 2/2016 | Sasaki | G06F 21/6218 726/27 |
| 2017/0149795 A1 | 5/2017 | Day, II | |

* cited by examiner

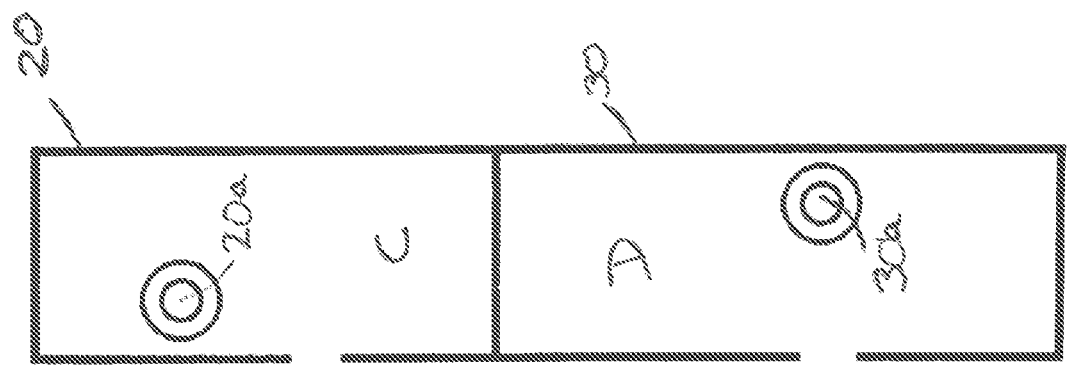
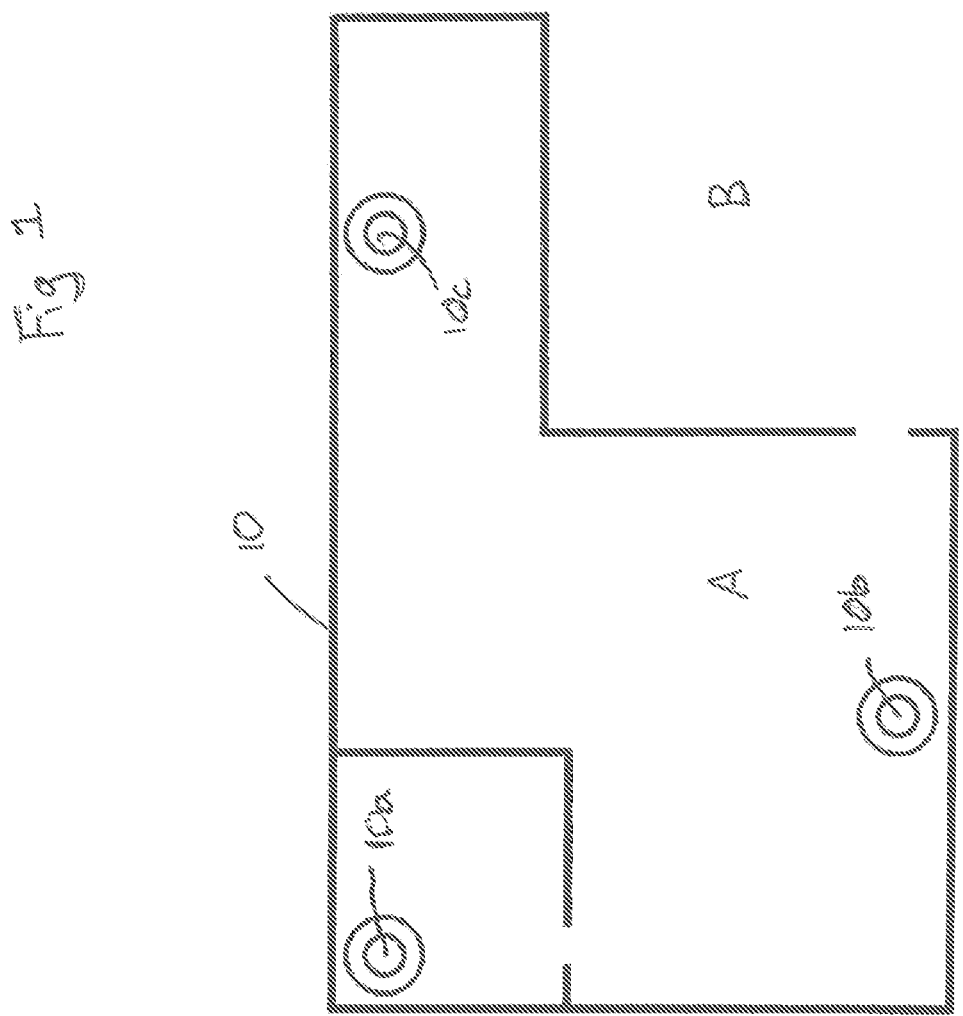
Fig 1

BLOCKING FUNCTIONALITY ON A SMART DEVICE

TECHNICAL FIELD

The present disclosure relates to a method of blocking functionality on a smart device. In particular, the disclosure relates to a method of blocking apps and/or features such as a camera or browser of a smart device. The present disclosure also relates to a system that performs the method.

BACKGROUND OF THE INVENTION

Many businesses lose productivity from employees using electronic devices during work hours for personal business. There are many techniques for businesses to monitor usage of computers, e.g., PCs connected to the company network.

Bring-Your-Own-Device (BYOD) is becoming a more common practice in businesses, wherein employees use their own smart device, e.g. mobile phone, for work business. This can save costs for the company as the company does not need to supply and maintain a number of devices for their employees. However, there is the potential for lost productivity with BYOD arrangements as employees may be more likely to use their own smart device for personal use during working hours if they are allowed to be seen using their own devices for work business. If the employee's device is not connected to the company network and is, for example, using mobile internet, then it is difficult for employers to monitor whether employees are using their own smart devices for work or personal use during working hours.

Furthermore, the use of BYODs in the workplace can have serious security implications. Some apps and features are particularly vulnerable to cyber attacks, and some enable users to intentionally or mistakenly disseminate confidential business information.

SUMMARY OF THE INVENTION

According to a first aspect, the invention provides a method of blocking one or more app(s) and/or feature(s) on a smart device, wherein the smart device comprises a GPS receiver and one or more wireless receiver devices; the method comprising, on the smart device: detecting, by a control app running on the smart device, movement of the smart device into or out of a predetermined region based on data received by the GPS receiver and/or one or more of the wireless receiver devices; blocking one or more app(s) and/or feature(s) on the smart device when the smart device is within the predetermined region.

The invention therefore enables the blocking of app(s) and/or feature(s) when the smart device is in a certain region, such as the workplace. This improves security, e.g. by preventing employees intentionally or mistakenly disseminating confidential information, and reduces wasted work time due to employees using apps and/or features on their phone in the workplace.

The step of blocking may comprise blocking one or more predetermined app(s) and/or feature(s). That is, the blocking may be in the form of a "blacklist" of apps that are not allowed to be used when the smart device is in the predetermined region.

The step of blocking may comprise blocking all apps and/or features on the smart device except for one or more predetermined app(s) and/or feature(s) when the smart device is within the predetermined region. That is, the blocking may be in the form of a "whitelist" of apps that are the only apps/features allowed to be used when the smart device is in the predetermined region.

These "blacklist" and "whitelist" concepts are applicable to all the various embodiments and aspects of the invention described herein. Thus, where blocking of app(s) and/or feature(s) is described, this may utilise the particular blacklist or whitelist concepts as discussed above.

Operating systems on smart devices will usually allow restricted access to regular users, and higher level access to those with administrator or root-level privileges. The restricted access is partly to prevent a user from affecting features necessary for the stable operation of the smart device. For example, a regular user will generally be prevented from accessing the functions that determine memory allocation or how a touchscreen operates, or how the phone registers with a cellular network. These apps and features that are not accessible to a regular user (one without special access privileges) are beyond the purview of the present disclosure. That is, "apps" and "features" referred to herein generally refer to those apps and features that can be blocked by a user who does not have administrator or root-level privileges. In the industry, such apps and features are commonly referred to as "manageable" (i.e. "manageable apps" and "manageable features"), in that a regular user can manage those apps without special access permissions via the device settings or enrolment in and use of a MDM system. Thus, the invention blocks app(s) and/or feature(s) based on where the smart device is located. Preferably however, app(s) and/or feature(s) are blocked additionally based on whether a time is within a predetermined time period. Thus the method may further comprise determining a current time; and wherein the one or more app(s) and/or feature(s) is blocked when both the smart device is within the predetermined region and the current time is within a predetermined time period. The method may therefore comprise determining whether a current time is within the predetermined time period. In a preferred embodiment, a server with which the smart device may communicate determines whether a current time is within the predetermined time period based on the time of a clock of the server.

The smart device and a server with which the smart device may communicate may each comprise a clock. In the case of a blacklist as described above, the one or more predetermined app(s) and/or feature(s) may be blocked when both the smart device is within the predetermined region and when a time determined from one or both of the clocks is within a predetermined time period. Or, in the case of a whitelist as described above, all the apps and/or features of the smart device except for one or more predetermined app(s) and/or feature(s) may be blocked when both the smart device is within the predetermined region and when a time determined from one or both of the clocks is within a predetermined time period.

If the server comprises a clock, the method may further comprise the server determining the current time from the clock and sending the current time to the control app of the smart device.

Thus, according to a further aspect, the invention provides a method of blocking apps and/or features on a smart device that is configured to communicate with a server, wherein the smart device comprises a GPS receiver and one or more wireless receiver devices; the method comprising: determining a current time; detecting, by a control app running on the smart device, movement of the smart device into or out of a predetermined region; and blocking one or more app(s)

and/or feature(s) on the smart device when the smart device is within the predetermined region.

In the case of blocking one or more predetermined app(s) and/or feature(s), the invention envisages the blocking of only one predetermined app and/or feature. However, the invention may typically include the blocking of more than one predetermined app and/or feature. Furthermore, in the case of blocking all apps and/or features except for one or more predetermined app(s) and/or feature(s), the invention envisages the exception of only one predetermined app and/or feature from the blocking. However, the invention may typically including the exception of more than one predetermined app and/or feature from the blocking. Thus, plural apps and/or features are often referred to herein. A predetermined set of apps and/or features is also referred to.

By blocking apps and/or features based on both spatial location and time, app/feature blocking can be more tightly controlled. For example, the smart device may be an employee's smart device. An employer may desire apps and/or features to be blocked whilst the employee is at work. By defining a predetermined region relating to the workplace, and defining a predetermined time relating to working hours, app blocking can be particularly accurately implemented. Accurate implementation is very important since employers would want to ensure that apps/features are correctly blocked in the workplace to provide the advantages thereof, but both employers and employees would not wish apps/features to be erroneously blocked when the employee is not at work.

Preferably, the smart device is configured to communicate with a server.

Preferably, the server comprises a clock and the method further comprises the server determining the current time from the clock and sending the current time to the control app of the smart device in order to prevent a user attempting to circumvent app blocking by modifying the time of the smart device's clock.

The one or more wireless receiver devices may be any combined device having receiver functionality. For example, the wireless receiver devices may further comprise transmission functionality. The wireless receiver devices may be transceivers.

The one or more wireless receiver devices may include a Bluetooth receiver device and/or a Wi-Fi receiver device and/or a cellular network receiver device. In accordance with the above, a Bluetooth receiver device may be a Bluetooth transceiver, a Wi-Fi receiver device may be a Wi-Fi transceiver and a cellular network receiver device may be a cellular network transceiver.

The GPS and wireless receiver devices may be considered as "sensors" that provide location data.

Blocking apps/features may also be described as filtering apps/features. Blocked apps/features may be considered as disabled functionality, whilst unblocked apps/features may be considered as enabled functionality.

The one or more pre-determined app(s) and/or feature(s) which are blocked may be termed a blacklist. The blacklist may include for example apps such as Facebook, WhatsApp and Instagram. Other apps that may be blocked may be apps that control lower-level functionality of the smart device, such as controlling the camera optics and CCD. A feature that may be blocked may include a camera. Another feature that may be blocked may include a browser. Such features may be blocked at the system level. Apps and features may together be described as "functionality" or "functions" of the smart device. In this case of this option, i.e. "blocking one more predetermined app(s) and/or feature(s) on the smart device when the smart device is within the predetermined region", the method may including blocking those app(s) and/or feature(s) except for other app(s) and/or feature(s) and indeed except for all other app(s) and/or feature(s).

The one or more pre-determined app(s) and/or feature(s) which are not blocked (when all other apps and/or features are) may be termed a whitelist. The whitelist may include for example a work email program.

The one or more predetermined app(s) and/or feature(s) may be selected by an administrator, e.g. an employer. The administrator may select the apps and/or features at the server, the server may then send this pre-determined list of apps and/or features to the smart device.

This allows employers to ensure that apps and/or features that are not relevant for employee's work are not available on that employee's device when the employee is within the predetermined region (e.g. the workplace) and during a predetermined time period (e.g. working hours).

The smart device may typically be a smart phone, tablet or smart watch. Preferably, the smart device has an Android OS or iOS.

The data received by the GPS receiver and/or one or more wireless receiver devices provides an indication of the location of the smart device.

Thus the step of detecting movement into or out of a predetermined region based on data received by the GPS receiver and/or one or more of the wireless receiver devices comprises obtaining an indication of the location of the smart device from the data.

The step of detecting movement into or out of a predetermined region may comprise determining the current spatial location of the smart device using the GPS data and/or data from one or more of the wireless receiver devices (e.g. Wi-Fi, Bluetooth); and assessing whether this location falls within or without the predetermined region.

Determining the current spatial location and assessing whether it falls within or without the predetermined region may be part of a single step. For example, if data is received by a Bluetooth device indicating that a particular Bluetooth beacon has been detected, and if the predetermined region is defined as one in which that particular Bluetooth beacon is detectable, then by detecting the Bluetooth beacon it is known that the smart device is within the predetermined region.

The predetermined region may comprise at least one of the following areas: a 2D spatial region defined by a predetermined set of GPS coordinates; a 2D spatial region defined by a single predetermined GPS coordinate and a radius from that GPS coordinate; a region in which a predetermined network identifier is detected by the wireless receiver device. The predetermined network identifier may be a SSID or UUID. In the case of a UUID, this may be a Bluetooth Low Energy (BLE) Beacon UUID.

The step of detecting movement into or out of the predetermined region based on data received by the GPS receiver and/or one or more of the wireless receiver devices may therefore comprise determining whether a GPS coordinate of the location of the smart device is within a 2D spatial region defined by a predetermined set of GPS coordinates. It may comprise determining whether the GPS coordinate of the location of the smart device is within a 2D spatial region defined by a single predetermined GPS coordinate and a radius from that GPS coordinate. It may comprise determining whether a predetermined network identifier such as a Wi-Fi SSID or Bluetooth Low Energy Beacon UUID is detected by the wireless receiver device of the smart device. Such steps could readily be implemented in a control app by a person skilled in the art.

The predetermined region may comprise a superposition of more than one of the aforesaid areas. For example, the predetermined region may comprise both a 2D spatial region defined by a set of GPS coordinates and a region in which a pre-determined network identifier (e.g. the workplace Wi-Fi network) is detectable by the wireless receiver device. By detecting movement into or out of a predetermined region comprising both these areas, it does not matter if, for example, GPS reception is poor. This is because the app can detect movement into/out of the 2D spatial region by the network identifier.

Preferably, the method comprises the server receiving data from the device indicating the device has moved into a predetermined region, and the server determining based on this information that one or more pre-determined app(s) and/or feature(s) should be blocked or that all apps and/or features should be blocked except for one or more certain pre-determined app(s) and/or feature(s), and the server sending this decision to the device.

Therefore preferably the method may further comprise the control app sending data relating to movement of the smart device into or out of the predetermined region to the server. The method may further comprise the server determining, based on this data, whether app(s) and/or feature(s) should be blocked on the smart device. The method may further comprise the server communicating with the smart device to provide instructions to block app(s) and/or feature(s), wherein the blocking is carried out in response to these instructions.

When the server receives data relating to movement of the smart device out of the predetermined region, the server may determine whether a current time is within a predetermined time period and additionally use this to determine whether app(s) and/or feature(s) should be blocked. For example, if the smart device has moved into the predetermined region and the current time is within the predetermined time period, then the server may determine that app(s) and/or feature(s) should be blocked. The server may then communicate instructions to the smart device or the control app at the smart device to block app(s) and/or feature(s).

The predetermined time period may be selected by an administrator, e.g. an employer. The administrator may set the predetermined time period at the server. The server may sends this to the smart device.

The method may comprise the steps of: the smart device sending to the server a set of current smart device parameters that are currently applied on or detected by the smart device; the set of parameters comprising at least one of: some or all current app permissions for the control app, the current activation state of one or more wireless receiver devices of the smart device, and the current state of a manual override switch of the control app in the smart device; the method further comprising the steps of:

a. the server determining whether the current smart device parameters conform to a predetermined set of parameters; and b. when the current smart device parameters do not conform to the predetermined set of parameters, sending a notification to the smart device to instruct the smart device or a user of the smart device to adjust the current device parameters applied on the device.

This can improve the functionality of the control app and ensure user compliance with implementing the method. For example, if the server determines that the current activation state of a wireless receiver device is off when it should be on, the smart device (or user of the smart device) is instructed to turn it on. This would e.g. prevent a user trying to circumvent the blocking of apps on their device by turning off Bluetooth.

The method may comprise the step of the server sending notifications to the smart device to set or update the predetermined region.

This allows an administrator to set or amend the predetermined region at a single point, the server, and the server then updates the corresponding predetermined regions for each device (e.g. each employee's device) that is configured to perform the method.

When the current control app permissions are determined to not conform to the control app permissions of the predetermined set of parameters, the method may comprise the step of the server pushing a notification to the smart device to initiate communication with the server.

When the activation state of the GPS receiver and the or each wireless receiver device are determined to not conform to a desired activation state, the method may comprise the step of the server sending a notification to the smart device to notify a user to change the activation state of each of the GPS receiver and the or each wireless receiver device that are determined to not conform to a desired activation state.

The method may further comprise the smart device sending to the server one or more of: network identifiers for any wireless networks that are detected by the smart device, visible beacons and current GPS coordinates of the smart device.

The smart device may be associated with a first user, and the server may maintain a record of the current control app permissions for the control app on the smart device; and when the control app permissions are determined to not conform to the control app permissions of the predetermined set of parameters more than a predetermined number of times, the server sends an alert to a second user identifying the first user.

This allows auditing of an employee's compliance with the operation of the control app. If a given employee has (repeatedly) not given the correct control app permissions, then an administrator (i.e. a second user) may be alerted by the server.

The smart device may be associated with a first user, and the server may maintain a record of a frequency with which the smart device communicates with the server; and when the frequency drops below a predetermined frequency, the server sends an alert to a second user identifying the first user.

The smart device may be associated with a first user, and the server may maintain a record of the last time that the smart device communicated with the server. When a duration since the last time that the smart device communicated with the server exceeds a predetermined duration, the server may send an alert to a second user identifying the first user.

This allows another form of auditing employee's compliance with the operation of the control app, wherein an administrator may be alerted to the fact that an employee's device has not checked in recently with the server.

The method may further comprise unblocking blocked apps when movement of the smart device out of the predetermined region is detected by the control app. Unblocking may further be based on if the current time is outside the predetermined time period. In other words, the method may comprise determining when a location of the smart device moves out of the predetermined region and when the time falls outside of the predetermined time period, and when both these conditions are satisfied the method comprises unblocking (e.g. enabling) one or more app(s) and/or feature(s) that have been blocked on the smart device.

The step of detecting movement of the smart device out of a predetermined region is carried out by the control app. The smart device may send data relating to movement of the smart device out of the predetermined region to the server. The server may determine, based on this data, whether app(s) and/or feature(s) currently blocked on the smart device should be unblocked. Generally, if the smart device has moved out of the predetermined region, then the server will determine that currently blocked app(s) and/or feature(s) should be unblocked. The server will then communicate with the smart device or the control app at the smart device to provide instructions to unblock particular blocked app(s) and/or feature(s), or indeed all blocked app(s) and/or feature(s), wherein unblocking is carried out in response to these instructions.

When the server receives data relating to movement of the smart device out of the predetermined region, the server may determine whether a current time is within a predetermined time period and additionally use this to determine whether currently blocked app(s) and/or feature(s) should be unblocked. For example, if the smart device has moved out of the predetermined region and the current time is outside of the predetermined time period, then the server may determine that currently blocked app(s) and/or feature(s) should be unblocked. The server may then instruct the smart device or the control app at the smart device to unblock certain blocked app(s)/features or all blocked app(s)/features.

Regarding the blocking of apps on the smart device, this may be achieved by means of the control app. However the skilled person would readily appreciate that the particular implementation may depend on the operating system of the smart device. For example, blocking functionality will typically need to be implemented differently for an Android operating system than for an iOS. Particular examples for each of Android and iOS are described later in relation to the Figures.

In a further aspect, the invention provides a non-transitory computer readable storage medium and a processor that are configured to: detect, by a control app installed on a smart device, movement of a smart device into or out of a predetermined region based on data received by a GPS receiver and/or one or more wireless receiver devices of the smart device; and block one or more app(s) and/or feature(s) on the smart device when the smart device is within the predetermined region.

The non-transitory computer readable storage medium and processor may further be configured to block the one or more app(s) and/or feature(s) on the smart device additionally based on whether a current time is within a predetermined time period.

In a further aspect, the invention provides a system comprising a smart device and a server, wherein the smart device comprises a GPS receiver and one or more wireless receiver devices; wherein the smart device is configured to: detect movement of the smart device into or out of a predetermined region based on data received by the GPS receiver and/or one or more of the wireless receiver devices; and to block one or more app(s) and/or feature(s) on the smart device when the smart device is within the predetermined region.

In the system the server and/or the smart device preferably comprises a clock. The smart device may be configured to block one or more app(s) and/or feature(s) on the smart device additionally based on whether a current time of the clock is within a pre-determined time period.

The server may preferably be configured and reconfigurable to define the predetermined region and/or the predetermined time period, and/or the one or more predetermined app(s)/feature(s). The server may preferably be configured to communicate with the smart device to set the predetermined region, the predetermined time period, and/or the one or more app(s)/feature(s).

The server may contain editable computer-executable instructions to define the predetermined region and/or the predetermined time period and/or the one or more app(s)/feature(s); and the server may contain editable computer-executable instructions to communicate with the smart device to set the predetermined region and/or the predetermined time period and/or the one or more app(s)/feature(s).

This method and system of the invention may increase the productivity of a user of the smart device by blocking distracting apps and/or features (e.g. news apps, social media apps, dating apps, gaming apps, camera functionality) while the user is in a predetermined area during a predetermined time (e.g. at work, during working hours). Information security is also increased. Advantageously, the blocking is "smart" in that the functionality returns when the user is outside the predetermined area (e.g. when commuting, or out to lunch) and is on their own personal time.

For example, an employer may institute a BYOD policy contingent on such devices having the control app installed. The employer may then configure the server to identify the predetermined area (e.g. the workplace) and the predetermined time period (e.g. working hours), and may set which apps and/or features are allowed/blocked on the user's device.

A plurality of different smart devices (e.g. belonging to different employees of the same company) may connect to the same server (e.g. managed or configured by that company). This allows the company to set and update a common policy that applies to all the smart devices being used by employees as part of the BYOD scheme.

In the system, the or each wireless receiver device may be one of a Bluetooth receiver device (e.g. a Bluetooth transceiver), a Wi-Fi receiver device (e.g. a Wi-Fi transceiver), and a cellular network receiver device (e.g. a cellular network transceiver). This allows the predetermined region to be set in a variety of different ways. Where the wireless receiver device is a Bluetooth receiver device, the predetermined region may be defined by a Bluetooth beacon. Where the wireless receiver device is a Wi-Fi receiver device, the predetermined region may be defined as the region in which a specific Wi-Fi network is detected by the smart device.

In terms of the GPS receiver, the predetermined region may be defined by GPS coordinates.

Most modern smart devices will have all three types of receiver device (GPS, Wi-Fi, and Bluetooth) which allows for the predetermined region to be defined in multiple ways, increasing the flexibility of the system.

In addition to the above described advantages in relation to information security and increased productivity, a particular technical advantage of the methods and systems of the present invention can be that the smart device may run faster and/or have longer battery life.

In a further aspect, the invention provides a system comprising a smart device and a server, wherein the smart device comprises a GPS receiver and one or more wireless receiver devices; wherein the smart device contains computer-executable instructions to detect movement of the smart device into or out of a predetermined region based on data received by the GPS receiver and/or one or more of the wireless receiver devices; wherein the smart device contains computer-executable instructions to block one or more app(s) and/or feature(s) on the smart device when the smart device is within the predetermined region.

The server may contain editable computer-executable instructions to define the predetermined region. The server may contain editable computer-executed instructions to communicate with the smart device to set the predetermined region.

The server and/or the smart device may comprise a clock, and wherein the computer-executable instructions of the smart device may block one or more app(s) and/or feature(s) on the smart device additionally based on whether a current time of the clock is within a pre-determined time period.

The or each wireless receiver device may be one of a Bluetooth receiver device, a Wi-Fi receiver device, and a cellular network receiver device.

The server may contain computer-executable instructions causing the server to communicate with the smart device to set the predetermined region and/or the predetermined time period.

In yet another aspect, the invention provides a method carried out at a server, comprising: receiving from a control app of a smart device an indication of movement of the smart device into a predetermined region; and based on this indication, communicating instructions to the smart device or the control app of the smart device to block one or more apps and/or features at the smart device.

The server is considered as an invention in its own right, and thus in a further aspect, the invention provides a server, wherein the server is configured to: receive from a control app of a smart device an indication of movement of the smart device into a predetermined region; and based on this indication, communicate instructions to the smart device or the control app of the smart device to: block one or more app(s) and/or feature(s) on the smart device when the smart device is within the predetermined region.

The smart device is also considered as an invention in its own right, and thus in another aspect, the invention provides a smart device comprising a GPS receiver and one or more wireless receiver devices; the smart device being configured to: detect, by a control app running on the smart device, movement of the smart device into or out of a predetermined region based on data received by the GPS receiver and/or one or more of the wireless receiver devices; and to block one or more app(s) and/or feature(s) on the smart device when the smart device is within the predetermined region.

The present disclosure provides detailed examples for implementing the method and system on smart devices running iOS make by Apple Inc. and Android made by Google Inc. The control app may work in very similar ways for different variants of these operating systems. iOS has a number of different versions. Similarly, Android has a large number of variants, in particular, variants that are modified by third parties to use the base Android system along with other functionality programmed by that third party. Thus, in another aspect, the control app is configured to run on smart devices running one of iOS, Android, and any variants thereof.

It will be readily appreciated that the various optional and preferred features of certain embodiments described above may be used separately or in any combination, and are applicable to all of the aspects of the invention.

BRIEF DESCRIPTION OF THE DRAWINGS

Certain preferred embodiments of the present invention will now be described in greater detail, by way of example only and with reference to the accompanying drawings, in which:

FIG. 1 shows a plan view of three buildings; and

DETAILED DESCRIPTION

The below description describes the blocking of apps and/or features. However, from the above description it will be appreciated that the invention includes the blocking of only one app and/or feature. The below description simply relates to particular preferred embodiments.

FIG. 1 shows a plan view of three buildings 10, 20, 30. A first of the buildings 10 is a workplace of an employee. The other two buildings 20, 30 may be other workplaces of different companies.

Figure 3:
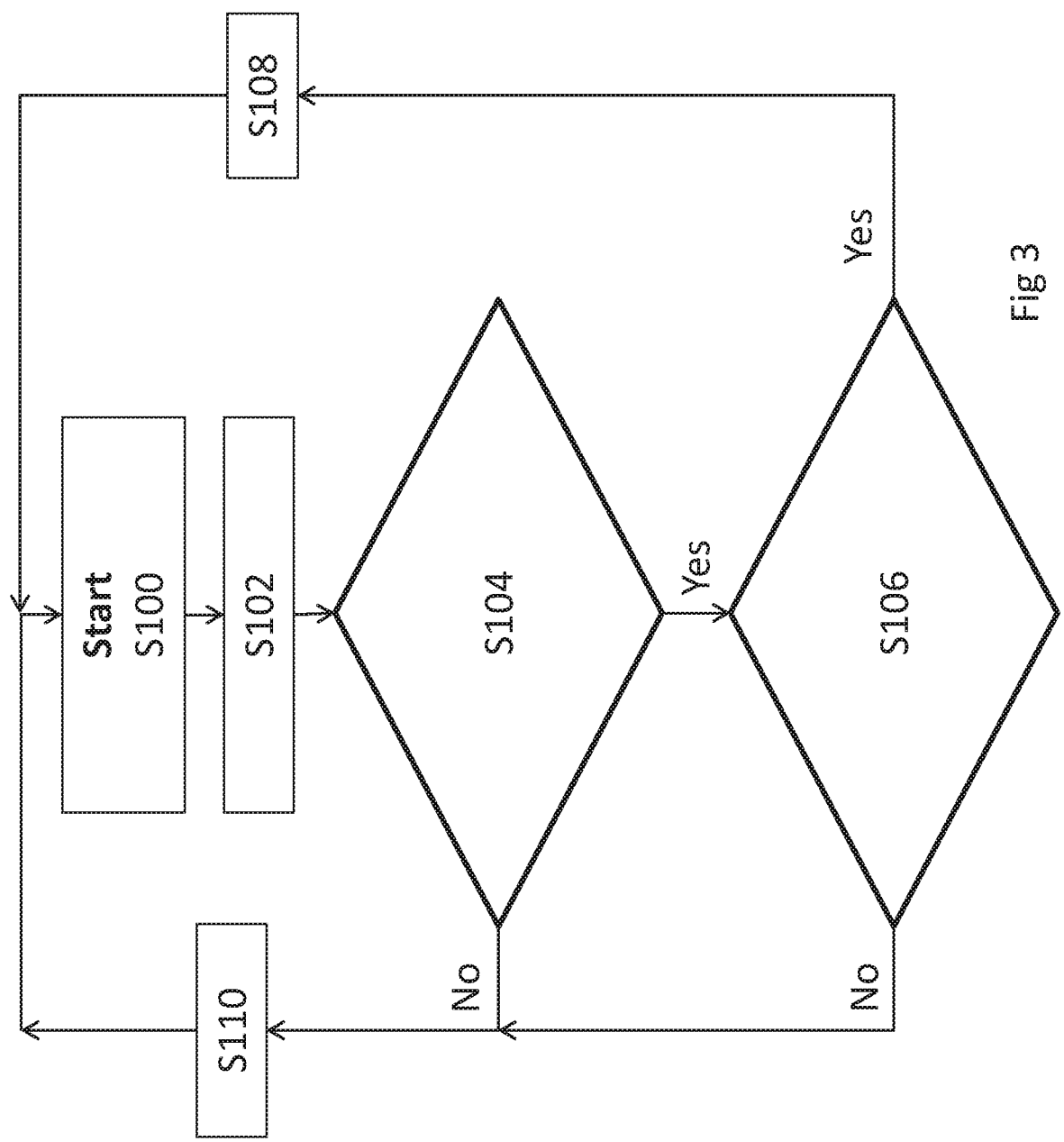
FIG. 3 shows a flow diagram of the process followed by a control app to determine whether to block/allow apps and/or features.

A company based in the first building 10 wants to allow employees to use their own smart devices (e.g., smartphones, tablets, laptops etc.) in the workplace while limiting access to certain apps and/or features on those devices when the employee is at the workplace and during working hours, so as to improve worker productivity. To achieve this, the employer may have the employees download a computer program (app) to their smart device(s). For example, an employee may be sent a message to their smart device inviting them to download the app from a particular link. The app (which may be termed a "control app") and server 50 (which may be referred to herein as the "Blackout Server") are configured to cooperate to perform the following steps, shown in FIG. 3:

Step 100: determine a location of the smart device;

Step 102: determine the current time;

Step 104: check if the current time is within a predetermined period of time;

Step 106: check if the location is inside a predetermined region;

Step 108: if the current time is within a predetermined period of time and the location is inside a predetermined region, then a predetermined set of apps and/or features (blacklist) are blocked on the smart device or all apps and/or features except for a predetermined set of apps (whitelist) are blocked on the smart device; else Step 110: turn off any blocking of apps and/or features (i.e. unblock those apps and/or features).

In other embodiments, step 104 may not be carried out and step 108 may involve blocking based on the location only.

The blocking may be effected by the control app or via server interaction with the smart device. How blocking is effected may depend on the operating system running on the smart device, e.g., iOS or Android. Embodiments of blocking functionality are described later.

The current time may be determined from a clock on either the server 50 or on the smart device 40. Preferably, the time is determined from a clock on the server 50 to avoid user circumvention by changing the clock on their smart device 40.

In this embodiment, the server 50 runs the software that makes decisions about when to activate or deactivate app and/or feature blocking on the smart device 40. The smart device 40 is configured to contact the server 50 in response to certain events, such as the arrival of a push notification or a detected movement into or out of the predetermined region, at which point, the smart device 40 transmits to the server 50 data regarding the current state of the smart device 40. In particular, the smart device 40 sends data including at least one of: the current app permissions of the control app, the current activation state of the GPS receiver and all wireless receiver device(s), and the current state of a manual override switch of the control app in the smart device 40. The smart device will send data relating to the detected movement into or out of the predetermined region. The smart device 40 may also send the network identifiers for all wireless networks that are detected by the smart device and any visible beacons (e.g., Bluetooth beacons). Based on the received information, the server 50 then communicates with the smart device or the control app at the smart device to instruct the smart device or the control app at the smart device to block or unblock apps and/or features on the smart device 40. Exemplary implementations of the blocking functionality are described later for each of iOS and Android in relation to FIGS. 5 and 6.

As a result of the above, when an employee is in the workplace during working hours, the smart device 40 is configured (by the control app) to block user access to certain apps and/or features.

The predetermined region may be defined in different ways. For example, in FIG. 1, the employer may define the predetermined region as an area defined by a set of GPS coordinates defining the shape of the building 10. In this instance, an employee at location A would be within the predetermined region and thus, during a predetermined time period e.g. working hours, the control app would be active in blocking certain apps and/or features or allowing certain apps and/or features on an employee's smart device, as appropriate.

Figure 2:
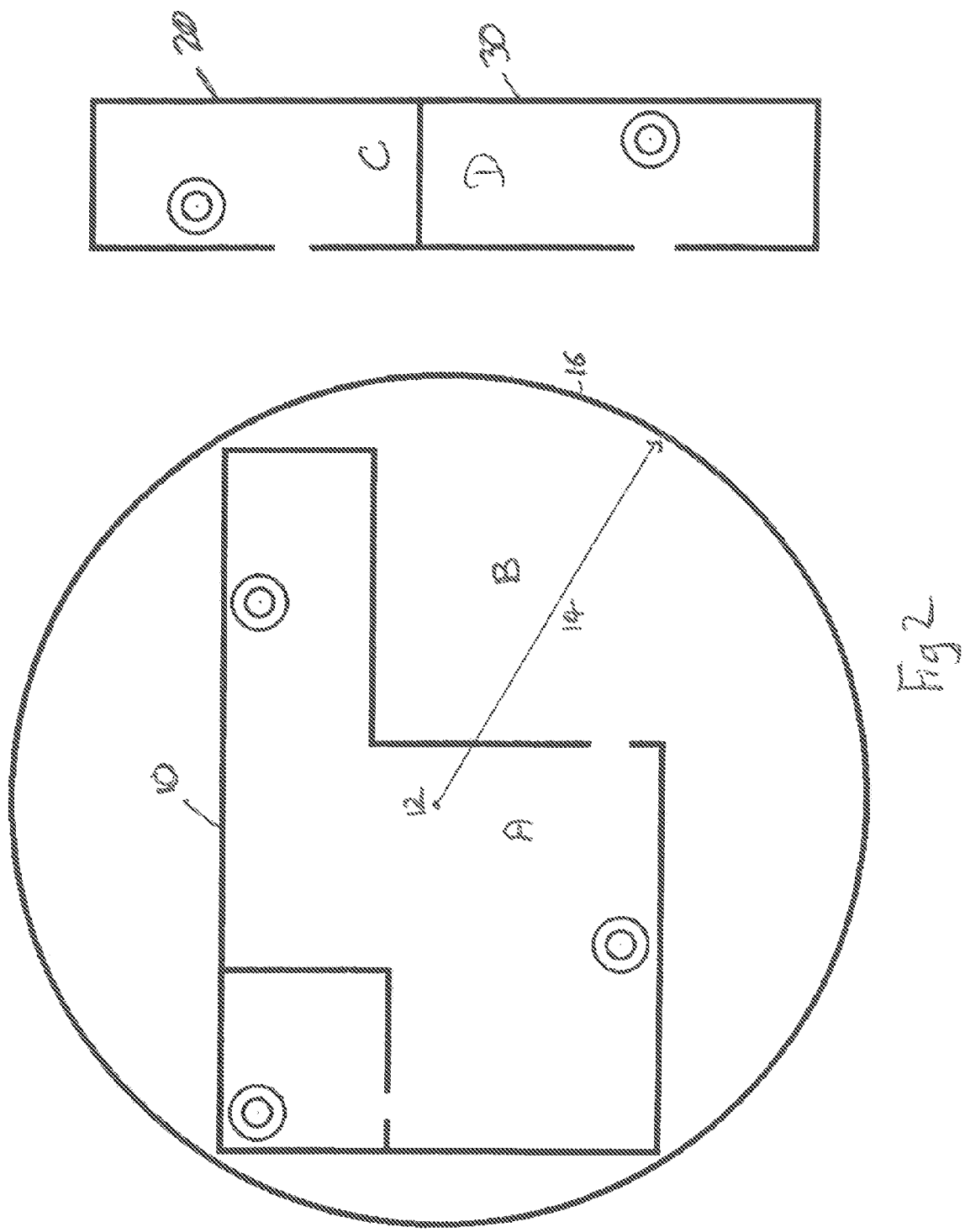
FIG. 2 shows a plan view of three buildings with a circular region defined.

Alternatively or additionally, the predetermined region may be defined as an area defined by a single GPS coordinate 12 and a radius 14, thereby defining a circular region 16. As shown in FIG. 2, this region may extend beyond the building 10 and consequently an employee at either location A or location B would be within the predetermined region.

The predetermined region may comprise one or more areas defined in different ways. The predetermined region may be a superposition of such areas or an aggregation of such areas. For example, the predetermined region may comprise an area defined by a set of GPS coordinates and an area defined by a single GPS coordinate and a radius. Thus, if an employee is within a pre-determined region comprising a superposition or aggregation of any of a plurality of areas thus defined, the control app on the employee's smart device would be active in blocking.

Alternatively, or additionally the predetermined region may be defined as any place at which the smart device 40 can detect a particular wireless network. FIG. 1 shows a number of wireless emitters 10a-c that are associated with the first building 10. The other buildings 20, 30 may also have their own wireless emitters 20a, 30a. The wireless emitters may be, for example, a Wi-Fi device such as a Wi-Fi router or Wi-Fi extenders, or a Bluetooth device, such as a Bluetooth beacon.

In this example, the predetermined region is defined as anywhere that a smart device 40 owned by an employee of the first building 10 can detect the wireless emitters 10a-c of the first building.

Smart devices can commonly detect a number of wireless emitters without connecting to any of those wireless emitters. The wireless emitters 20a, 30a of the second and third buildings 20, 30 are not associated with the company of the first building 10. Therefore, even if a smart device 40 detects these wireless emitters 20a, 30a, they do not define the predetermined region. Thus, the smart device 40 of an employee of the first building 10 at location C may detect wireless network 20a but provided that smart device 40 cannot detect any of the wireless emitters 10a-c of the first building 10, then location C is outside the predetermined region. The skilled person would readily appreciate how to configure the control app to distinguish between wireless emitters defining the predetermined region and wireless emitters unrelated to the predetermined region, e.g., by virtue of a particular identifier.

Similarly, if an employee of the second building 20 is at location A with their smart device 40, then their smart device 40 may detect one or all of the wireless emitters 10a-c of the first building 10 but, unless their smart device 40 can detect the wireless emitter 20a of the second building, location A is outside the predetermined region for that employee's smart device 40.

Put another way, each smart device 40 can be configured to use different methods to identify predetermined regions. Thus, a first smart device 40 may have a predetermined region defined by the GPS coordinate 12 and radius 14, shown in FIG. 2. A second smart device 40 may have a predetermined region defined by its being able to detect a given wireless emitter 30a.

The control app thus gathers data relating to the location of the smart device e.g., GPS data from a GPS receiver and/or data relating to the detection of a network identifier e.g., from a wireless receiver device such as a Bluetooth receiver device, Wi-Fi receiver device or cellular network receiver device. The GPS and wireless receiver devices may be considered as "sensors" that provide location data. The control app assesses, based on the location data, whether the location is within the predetermined region. If it is, the control app contacts the server.

Preferably, the set of apps and/or features may be determined as a whitelist—i.e., the employer prepares a list of apps and/or features that are allowed to be used during working hours and in the workplace, and all other apps and/or features are blocked by default.

Alternatively, the set of apps and/or features may be determined as a blacklist—i.e., the employer prepares a list of apps and/or features that are to be blocked during working hours and in the workplace, and all other apps and/or features are allowed by default.

A smart device may run faster or have a longer battery life as a consequence of blocking apps and/or features in the manner provided by the present disclosure.

It is a general feature of smart device operating systems (OSs,) that any given app requires various "permissions" to interact with the device itself and with other apps. Usually when a user downloads an app, the device alerts the user to what app permissions are required for the proper functioning of that downloaded app. For example, it is common for apps to require internet access in order to deliver adverts to users using the app. It is also common for an app to request access to the user's contacts stored on the smart device if that app has functionality to share data with others (e.g., by sending a text message or email to other users devices from within that app).

To implement the above-described method via an app, it is important that the control app has the correct permissions.

Consequently, the server 50 is provided with a list of the required control app permissions. The control app may communicate a list of current control app permissions to the server 50. The list of current control app permissions may be considered as a type of "current smart device parameters". The server 50 may check whether the current control app permissions match the list of required control app permissions. If the smart device 40 does not have the correct control app permissions, the server 50 may send a push notification to the smart device 40 to request the smart device 40 to contact the server 50. The server 50 then sends information to the control app to notify the user that they need to adjust their permissions or to cause the control app to automatically adjust the permissions. Push notifications may be performed by the Urban Airship service, for example.

Figure 4:
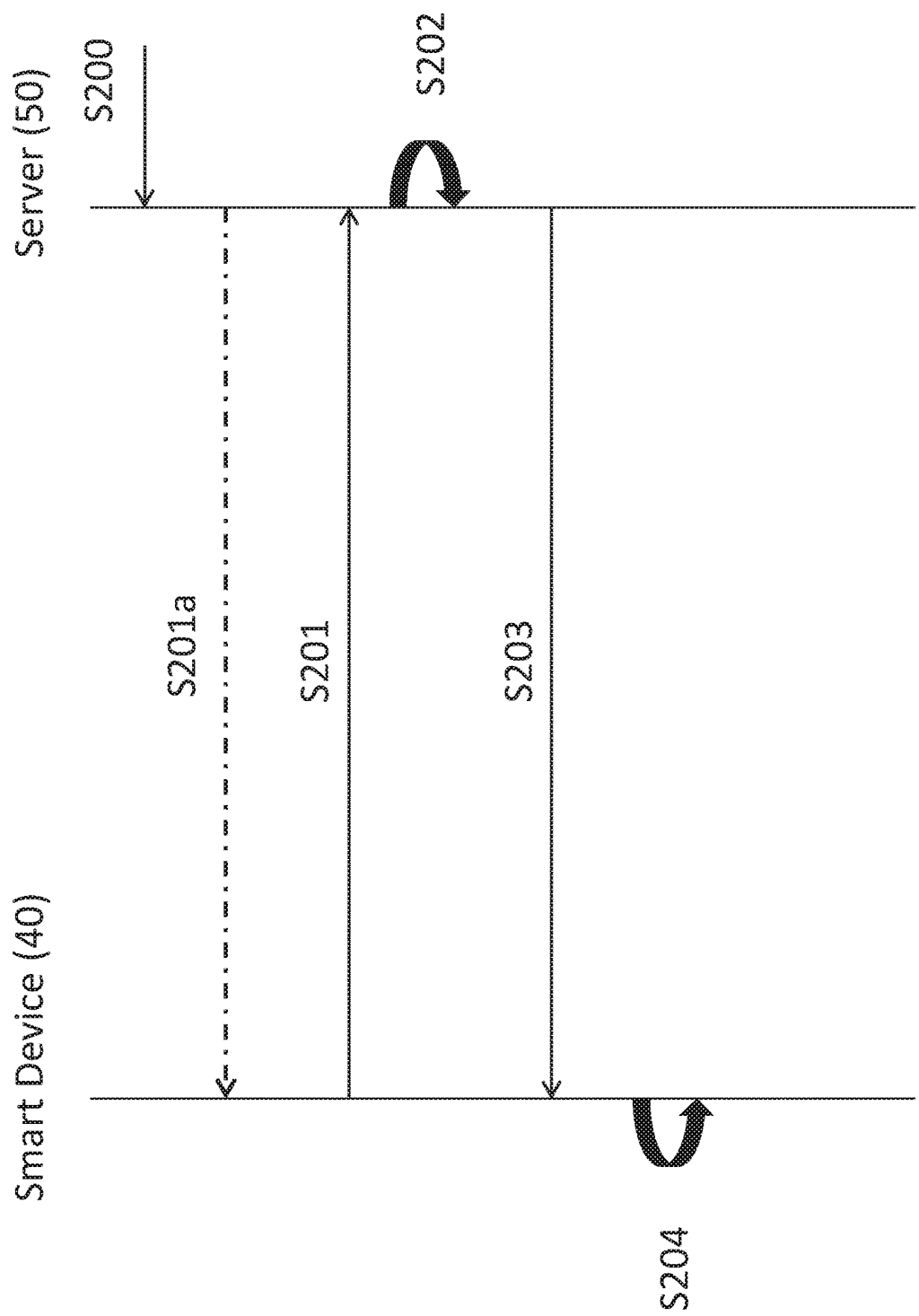
FIG. 4 shows a sequence diagram for updating the pre-determined region from a server to the smart device.

FIG. 4 shows a sequence diagram of this process.

Step 200: a user, e.g., an administrator, sets the predetermined parameters (e.g. required control app permissions) on the server 50.

Optional step 201*a*: the server 50 requests the smart device 40 to send a list of current parameters. These parameters may include current control app permissions set on the smart device 40; the current activation state of the or each wireless receiver device of the smart device 40; and the current state of a manual override switch of the control app on the smart device 40. Network identifiers for any wireless network that are detected by the smart device 40 may also be requested by the server.

Step 201: the control app sends the list of current parameters to the server 50, including the current control app permissions and optionally the network identifiers, in accordance with the request.

Step 202: the server 50 checks whether the current parameters conform to a predetermined set of parameters.

Step 203: if the current parameters do not conform to the predetermined set of parameters (e.g., if the current control app permissions do not conform to the required control app permissions) then the server 50 sends a notification to the smart device 40 containing the predetermined set of parameters (i.e. specifying the control app permissions required).

Step 204: the smart device 40 then applies the parameters or requests a user to apply the predetermined set of parameters, as required. Thus, since the parameters include current control app permissions, the smart device 40 applies the predetermined control app permissions or requests the user to do so.

If a user persistently has the incorrect permissions, this could indicate that the user is attempting to circumvent the app when at the workplace during working hours. Thus, an audit method may be implemented in which, if the app permissions for a given smart device 40 are determined to be incorrect more than a certain number of times (e.g., 5 times, or on 5 different working days), the server 50 may send an alert to a second user, e.g., a supervisor at the firm, to identify the smart device 40 and its owner and alert the second user that this person may be trying to circumvent the control app's functionality.

Alternatively, a user may attempt to circumvent the control app by preventing the control app from contacting the server 50 (e.g., by disabling all wireless communication systems on their smart device 40). Thus, the server 50 may store either or both of a frequency with which the control app connects to the server 50 and a time (duration) since the smart device 40 last connected to the server 50. If the frequency of contact is too low, the server 50 may alert a second user, e.g. a supervisor that the user may be trying to circumvent the control app. If the time since the last communication from the control app is too long, the server 50 may alert a second user, e.g., a supervisor, that the user may be trying to circumvent the control app.

As mentioned previously, the particular implementation of the method and system will depend on the operation system running on the smart device. In particular, the implementation of the blocking functionality will be different for each of iOS and Android.

An implementation of the control app 42*a* (see FIG. 5) that is configured to run on iOS produced by Apple Inc. has no capability to directly block or unblock apps and/or features (in other words, to activate or deactivate app filters) or to directly determine the state of blocking (i.e. the state of filters). It relies on the server side elements for this. iOS smart devices 40 may be enrolled in a Mobile Device Management system implemented by the server 50. This allows the MDM system to manage the smart device. The smart device may therefore be termed a "managed device". The control app gathers data relating to the location of the smart device as previously described, e.g. using sensors such as a GPS receiver, Bluetooth receiver device, Wi-Fi receiver device or cellular network receiver device. Movement into or out of a predetermined region can be detected based on this sensor data as previously described, and this enables the MDM to be instructed to set the allowed functionality of the device (e.g., if/what apps are to be blocked) on the managed device. In terms of specific implementation, depending on the exact version of iOS on the smart device 40 and the level of allowed management, the MDM may instruct the smart device 40 to install or remove Configuration Profile(s) that control the availability of apps and/or device features. This is described further in relation to FIG. 5.

An implementation of the control app 42*b* (see FIG. 6) that is configured to run on the Android OS produced by Google Inc., on the other hand, is entirely responsible for the implementation of blocking (i.e., filters). This is because on Android, apps have a much higher potential control over other apps. The control app for Android may have a high level of permissions to affect the operation of other apps. There is currently variation in the field of supported Android OS versions and devices that may require use of a blend of techniques to achieve the app and/or feature blocking. The control app configured to run on Android may achieve app blocking through two approaches:

1. Accessibility Services. The control app 42*a* leads the user through the process of granting permission for the control app to detect when other apps go into the foreground and to 'draw over' them to prevent use.

2. VPN Services. The control app 42*a* will also prompt the user to grant the permissions necessary to prevent blocked apps from communicating directly with any networks.

Depending on their availability on a device's specific version of the Android OS, the control app 42*a* may use a blend of Android system services to prevent interaction with blocked apps by way of the main user interface, notifications, or other forms of app messaging. These include Accessibility Services, VPN Services, and access to the list of running processes.

Currently, on Android, apps have a much higher level of potential control over other apps on the same smart device (e.g., smart device 40). For this reason, an implementation of the control app configured to run on Android does not require the same device-wide influence as in the iOS case. The control app running on Android instead requires a high level of permissions to affect the operation of other apps. Blocking the use of the browser and camera, may be effected by blocking the apps used for opening those functions.

Figure 5:
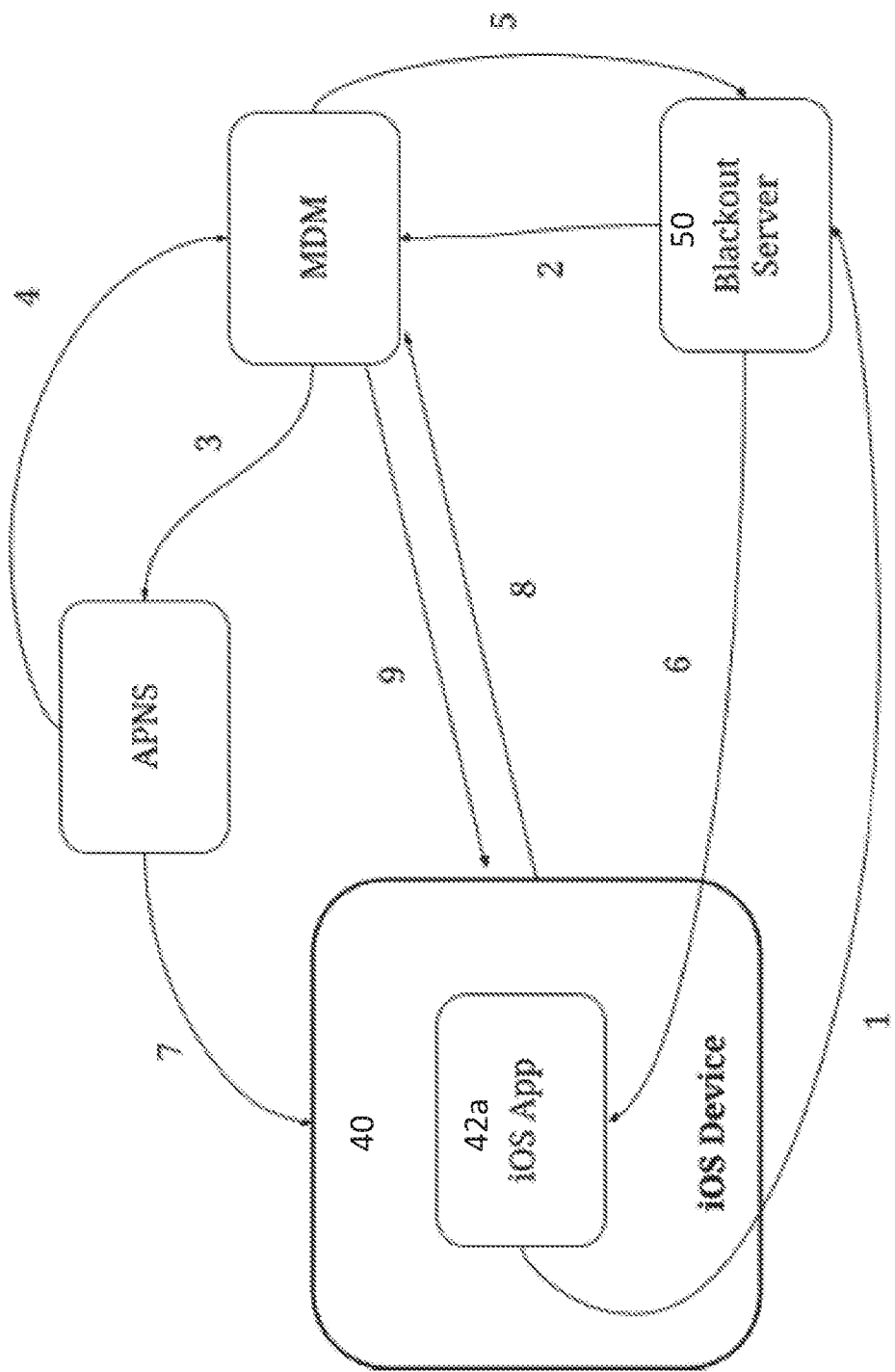
FIG. 5 shows an architecture diagram of the process of blocking apps and/or features on a smart device running the Apple iOS.
Figure 6:
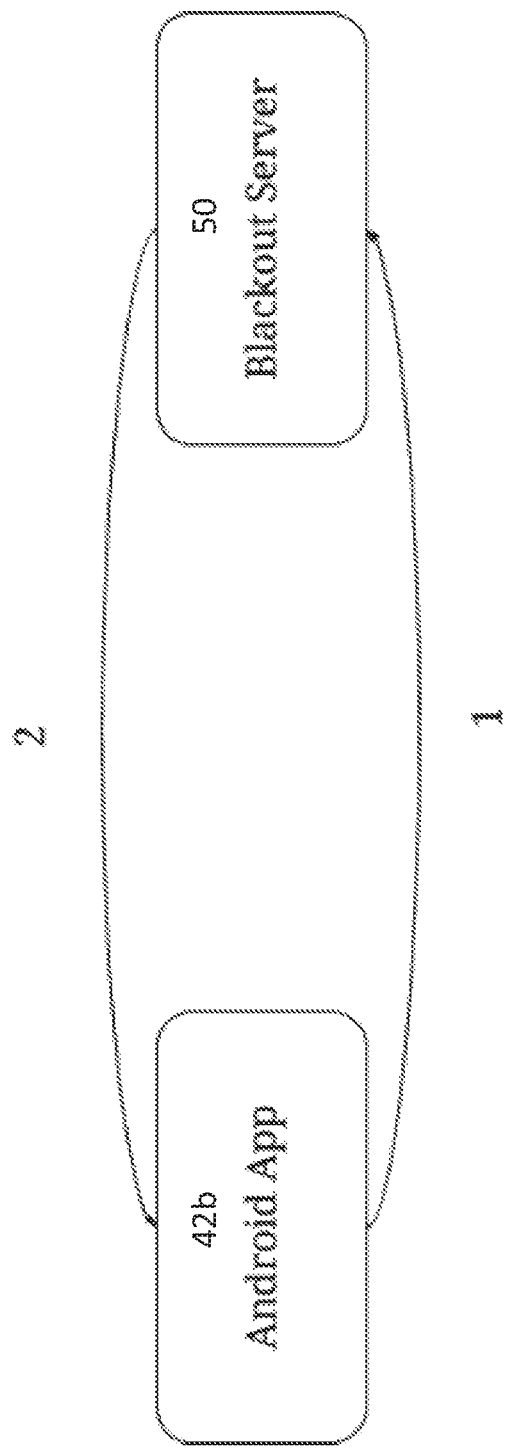
FIG. 6 shows an architecture diagram of the process of blocking apps and/or features on a smart device running the Android OS.

FIG. 5 shows an architecture diagram of the process of blocking apps on a smart device 40 running the Apple iOS. In this embodiment, iOS smart devices 40 having the control app 42*a* installed thereon are enrolled in a Mobile Device Management system implemented by a server 50. The server uses the iOS MDM features to control the functionality available (e.g., the apps and/or features that are blocked/not blocked) on managed devices as discussed above.

In iOS, it is possible for a device (e.g., smart device 40) to be enrolled in either one or zero MDM systems at a time. Enrolling in an MDM system allows the MDM system to manage the smart device in various ways including disable/ enabling apps, the camera, and the Safari web browser. There are two mechanisms of control. The MDM System can require a device to apply or remove any number of 'Configuration Profiles'. Disabling apps, the camera, and the Safari browser are all consequences of applying Configuration Profiles.

MDM Systems can also apply Commands to devices. Commands are typically changes of state like making a smart device install a certain app or putting the device in 'lost' mode.

The process of blocking apps as illustrated in FIG. 5 begins when an event occurs which causes the control app 42*a*, via the smart device 40, to contact the server 50. This event may be detection, by the control app 42*a*, of movement of the smart device 40 into or out of a known region (defined e.g., by GPS coordinates or by proximity to/detection of a wireless network etc.). Alternatively, the event may be a periodically scheduled event, such as a daily instruction to contact the server 50.

The flow of operations is as follows:

Step 1: An event occurs which causes the control app 42*a*, via the smart device 40, to contact the server 50. The control app 42*a* sends at least: the current app permissions of the control app 42*a*, the current activation state of the GPS receiver and all wireless receiver device(s), and the current state of a manual override switch in the smart device 40. If the control app 42*a* has detected movement of the smart device 40 into or out of the region, the control app will communicate this to the server 50.

Step 2: The server 50 receives the information and determines, based on that information and the time according to the server 50 clock, which if any apps and/or features on the smart device 40 should be blocked. The server 50 sends an instruction to the MDM containing a list of which, if any, apps should be blocked on the smart device 40.

Step 3: The MDM instructs the APNS to send a "wake up" message to the smart device 40.

Step 4: The APNS acknowledges the send-message instruction to the MDM.

Step 5: The MDM acknowledges the instruction from the server 50.

Step 6: The server 50 returns the current app permissions of the control app 42*a*, the current activation state of the GPS receiver and all wireless receiver device(s), and the current state of a manual override switch to the smart device 40.

Step 7: The APNS sends a "wake-up" message to the smart device 40. This is asynchronous with step 6.

Step 8: The smart device 40, on receipt of the "wake-up" message from the APNS, contacts the MDM to retrieve a list of what functionality (apps and/or features) which should be blocked or unblocked on the smart device 40. Blocked functionality may also be considered as disabled functionality; unblocked functionality may be considered as enabled functionality. So, blocked apps/features may also be considered as disabled apps/features; unblocked apps/features may also be considered as enabled apps/features.

Step 9: The MDM sends to the smart device 40 a list of what functionality (apps and/or features) should be blocked/ unblocked (disabled/enabled) and the smart device adjusts its settings accordingly.

In an alternative embodiment, the app 42*b* may be running on the Android OS. For these devices, the process of contacting the server 50 and blocking apps and/or features may be implemented according to the following process illustrated in FIG. 6:

Step 1: An event occurs which causes the control app 42*b*, via the smart device 40, to contact the server 50. The control app 42*b* sends at least: the current app permissions of the control app 42*b*, the current activation state of the GPS receiver and all wireless receiver device(s), and the current state of a manual override switch in the smart device 40. If the control app 42*b* has detected movement of the smart device 40 into or out of the region, the control app will communicate this to the server 50.

Step 2: The server 50 receives the information and determines therefrom which if any apps on the smart device 40 should be blocked. The server 50 replies to the smart device 40 with a list of which, if any, apps and/or features should be blocked on the smart device 40. The control app 42*b* then applies these blocks on smart device 40. Depending on the availability of Android system services on the specific version of the Android OS running on the smart device 40, a blend of system services is used to prevent interaction with blocked apps and/or features by way of the main user interface, notifications or other forms of app messaging. These include Accessibility Services, VPN Services and access to the list of running processes.

Some embodiments of the disclosure enable blocking of functionality such as a camera and/or a browser (e.g., the default browser). In an implementation of the control app for a smart device running iOS, the camera or browser (e.g., the Safari browser) can be disabled at the system level. In other words system-level blocking is carried out. This may be done by the server contacting the smart device (not the control app) and instructing the smart device to block/ unblock certain features such as the camera or browser (i.e. change the enabled/disabled functionality). This would be a simple implementation matter for the skilled person. Alternatively, an app which operates the camera or a browser app may be blocked as part of the above described app-blocking. In an implementation for a smart device running Android, system-level blocking is not carried out. Instead, the browser and camera apps are blocked from opening. This is extended app-level blocking.

In one embodiment of the invention, when a user e.g., employee wishes to make use of the control app (e.g., as a condition of a BYOD policy by the employer), the user can download the control app and register their smart device 40 with the server 50, such that the smart device 40 receives the correct settings regarding blocked apps and/or features, allowed apps and/or features, predetermined area, predetermined time etc. as set on the server 50, e.g., by the employer. On successful registration, the control app fetches the current configuration from the server 50 and then goes into an event loop. In this event loop, the control app contacts the server when a particular event occurs e.g. when relevant sensor data has changed, or, when it has been a particular time since the last contact.

More specifically, non-urgent event types may include movement of the smart device 40 from or into the proximity of the predetermined region and the current app foreground in use by the user. Urgent event types may be the receipt of a remote push notification from the server 50 and/or when a user changes state of the manual override switch in the UI of the control app.

When any of the above events occur, the control app will gather all relevant data (list of visible beacons, current GPS coordinates, current network SSID etc.), all relevant device states (permissions, activation state of Bluetooth etc.) and send it along with the current state of the manual override switch to the server 50. The server 50 will reply with the full current correct configuration and the expected state of app blocking (i.e. filter activation).

Part of the server 50 configuration will be a minimum amount of time the control app should wait before contacting the server 50 in response to a non-urgent event. This will be configurable on a per client (e.g., per employer) basis and will allow administrators to achieve the right balance of app blocking latency and system load and device battery impact.

In terms of the control app contacting the server after a particular time has lapsed since the last contact, the control app runs in the background on the device reporting information about the device's state to the server with a frequency determined by the server.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A method of blocking one or more app(s) and/or feature(s) on a smart device, wherein the smart device comprises a GPS receiver and one or more wireless receiver devices; the method comprising, on the smart device:
periodically detecting, by a control app running on the smart device, movement of the smart device into or out of a predetermined region based on data received by the GPS receiver and/or one or more of the wireless receiver devices;
when movement of the smart device into the predetermined region is detected,
blocking, by the control app, one or more app(s) and/or feature(s) on the smart device while the smart device is within the predetermined region and independently of any attempt to access the one or more app(s) or feature(s) on the smart device;
wherein the smart device is configured to communicate with a server;
the control app sending data relating to movement of the smart device into or out of the predetermined region to the server;
the server determining, based on this data, whether app(s) and/or feature(s) should be blocked on the smart device;
the server communicating with the smart device to provide instructions to block app(s) and/or feature(s), wherein the blocking is carried out in response to these instructions;
the smart device sending to the server a set of current smart device parameters that are currently applied on or detected by the smart device; and
wherein the set of parameters comprises: some or all current app permissions for the control app, the current activation state of one or more wireless receiver devices of the smart device, and the current state of a manual override switch of the control app in the smart device;
the method further comprising the steps of:
the server determining whether the current smart device parameters conform to a predetermined set of parameters; and
when the current smart device parameters do not conform to the predetermined set of parameters, sending a notification to the smart device to instruct the smart device or a user of the smart device to adjust the current device parameters applied on the device.

2. The method of claim 1, wherein the step of blocking comprises blocking one or more predetermined app(s) and/or feature(s).

3. The method of claim 1, wherein the step of blocking comprises blocking all apps and/or features on the smart device except for one or more predetermined app(s) and/or feature(s) when the smart device is within the predetermined region.

4. The method of claim 1, further comprising determining a current time; and
wherein the one or more app(s) and/or feature(s) is blocked when both the smart device is within the predetermined region and the current time is within a predetermined time period.

5. The method of claim 1, wherein the predetermined region comprises at least one of the following areas:
a 2D spatial region defined by a predetermined set of GPS coordinates;
a 2D spatial region defined by a single predetermined GPS coordinate and a radius from that GPS coordinate;
a region in which a predetermined network identifier is detected by the wireless receiver, optionally wherein the predetermined network identifier is a SSID or UUID, optionally wherein a UUID is a Bluetooth low energy beacon identifier.

6. The method of claim 1 wherein, if the control app permissions are determined to not conform to the control app permissions of the predetermined set of parameters, the method comprises the step of the server pushing a notification to the smart device to initiate communication with the server.

7. The method of claim 1 further comprising the smart device sending to the server one or more of: network identifiers for any wireless networks that are detected by the smart device, visible beacons and current GPS coordinates of the smart device.

8. The method of claim 1, comprising the step of the server sending notifications to the smart device to set or update the predetermined region.

9. The method of claim 4, further comprising the server determining whether a current time of a clock of the server is within the predetermined time period.

10. The method of claim 1, wherein the smart device is associated with a first user, and wherein the server maintains a record of the current control app permissions; and when the control app permissions are determined to not conform to the control app permissions of the predetermined set of parameters more than a predetermined number of times, the server sends an alert to a second user identifying the first user.

11. The method of claim 1, wherein the smart device is associated with a first user, and wherein the server maintains a record of a frequency with which the smart device communicated with the server; and when the frequency drops below a predetermined frequency, the server sends an alert to a second user identifying the first user.

12. The method of claim 1, wherein the smart device is associated with a first user, and wherein the server maintains a record of the last time that the smart device communicates with the server; and
when a duration since the last time that the smart device communicates with the server exceeds a predetermined duration, the server sends an alert to a second user identifying the first user.

13. The method of claim 1, wherein the or each wireless receiver device is one of a Bluetooth receiver device, a Wi-Fi receiver device, and a cellular network receiver device.

14. A processor in conjunction with a non-transitory computer readable storage medium configured to:
periodically detect, by a control app installed on a smart device, movement of the smart device into or out of a predetermined region based on data received by a GPS receiver and/or one or more wireless receiver devices of the smart device; and
block, by the control app, one or more app(s) and/or feature(s) on the smart device while the smart device is within the predetermined region and independently of any attempt to access the one or more app(s) or feature(s) on the smart device;
send, by the control app, data relating to movement of the smart device into or out of the predetermined region to a server;
determine, by the server, based on this data, whether app(s) and/or feature(s) should be blocked on the smart device;
communicate, by the server with the smart device, to provide instructions to block app(s) and/or feature(s), wherein the blocking is carried out in response to these instructions;
send, by the smart device a set of current smart device parameters that are currently applied on or detected by the smart device to the server;
wherein the set of parameters comprises at least one of: some or all current app permissions for the control app, the current activation state of one or more wireless receiver devices of the smart device, and the current state of a manual override switch of the control app in the smart device;
determining, by the server, whether the current smart device parameters conform to a predetermined set of parameters; and
send, by the server, a notification to the smart device to instruct the smart device or a user of the smart device to adjust the current device parameters applied on the device when the current smart device parameters do not conform to the predetermined set of parameters.

15. The non-transitory computer readable storage medium and a processor of claim 14, further configured to block the one or more app(s) and/or feature(s) on the smart device additionally based on whether a current time is within a predetermined time period.

16. A system comprising a smart device and a server, wherein the smart device comprises a GPS receiver and one or more wireless receiver devices;
wherein the smart device contains computer-executable instructions to detect periodically movement of the smart device into or out of a predetermined region based on data received by the GPS receiver and/or one or more of the wireless receiver devices;
wherein the smart device contains computer-executable instructions to block one or more app(s) and/or feature(s) on the smart device when the smart device is within the predetermined region and independently of any attempt to access the one or more app(s) or feature(s) on the smart device;
wherein the smart device contains computer-executable instructions to communicate with the server;
wherein the smart device contains computer-executable instructions to send data relating to movement of the smart device into or out of the predetermined region to the server;
wherein the server contains computer-executable instructions to determine, based on this data, whether app(s) and/or feature(s) should be blocked on the smart device; and
wherein the server contains computer-executable instructions to communicate with the smart device to provide instructions to block app(s) and/or feature(s), wherein the blocking is carried out in response to these instructions;
wherein the smart device contains computer-executable instructions to send to the server a set of current smart device parameters that are currently applied on or detected by the smart device;
wherein the set of parameters comprises: some or all current app permissions for the control app, the current activation state of one or more wireless receiver devices of the smart device, and the current state of a manual override switch of the control app in the smart device;
wherein the server contains computer-executable instructions to determine whether the current smart device parameters conform to a predetermined set of parameters; and
wherein the server contains computer-executable instructions to send a notification to the smart device to instruct the smart device or a user of the smart device to adjust the current device parameters applied on the device when the current smart device parameters do not conform to the predetermined set of parameters.

17. The system of claim 16, wherein the server contains editable computer-executable instructions to define the predetermined region;
and wherein the server contains editable computer-executed instructions to communicate with the smart device to set the predetermined region.

18. The system of claim 16, wherein the server and/or the smart device comprises a clock, and wherein the computer-executable instructions of the smart device block one or more app(s) and/or feature(s) on the smart device additionally based on whether a current time of the clock is within a pre-determined time period.

19. The system according to claim 16, wherein the or each wireless receiver device is one of a Bluetooth receiver device, a Wi-Fi receiver device, and a cellular network receiver device.

* * * * *